(12) United States Patent
Boyle et al.

(10) Patent No.: US 10,032,333 B1
(45) Date of Patent: *Jul. 24, 2018

(54) SYSTEM AND METHOD FOR COMMUNICATING BETWEEN A MOBILE COMMUNICATION DEVICE AND A GAMING DEVICE

(71) Applicant: Joingo, LLC, San Jose, CA (US)

(72) Inventors: Stephen S. Boyle, Lincoln, CA (US); Thang Dao, San Jose, CA (US)

(73) Assignee: Joingo, LLC, Incline Village, NV (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/840,007

(22) Filed: Aug. 30, 2015

Related U.S. Application Data

(63) Continuation of application No. 14/726,507, filed on May 30, 2015, now Pat. No. 9,129,314, which is a continuation of application No. 14/206,155, filed on Mar. 12, 2014, now Pat. No. 9,058,620.

(60) Provisional application No. 61/931,639, filed on Jan. 26, 2014.

(51) Int. Cl.
| | |
|---|---|
| *H04B 7/00* | (2006.01) |
| *G07F 17/32* | (2006.01) |
| *H04W 4/00* | (2018.01) |
| *G06Q 50/34* | (2012.01) |
| *A63F 13/332* | (2014.01) |
| *H04W 4/80* | (2018.01) |
| *H04W 84/12* | (2009.01) |

(52) U.S. Cl.
CPC ........ *G07F 17/3227* (2013.01); *A63F 13/332* (2014.09); *G06Q 50/34* (2013.01); *G07F 17/3244* (2013.01); *H04W 4/008* (2013.01); *H04W 4/80* (2018.02); *H04W 84/12* (2013.01)

(58) Field of Classification Search
USPC ...................................... 455/41.2
See application file for complete search history.

(56) References Cited

U.S. PATENT DOCUMENTS

| | | | | |
|---|---|---|---|---|
| 2014/0018155 | A1* | 1/2014 | Nelson ............... | G07F 17/3225 463/25 |
| 2015/0321089 | A1* | 11/2015 | Akavia ............... | A63F 13/235 463/39 |

* cited by examiner

*Primary Examiner* — Ankur Jain
(74) *Attorney, Agent, or Firm* — Clause Eight IPS; Michael Catania

(57) ABSTRACT

A system and method for communicating between a mobile communication device and a venue apparatus is disclosed herein. The system comprises a mobile communication device, a venue apparatus, and a wireless local area network (WLAN) for a venue. The venue apparatus comprises a beacon for transmitting low energy BLUETOOTH transmissions. The mobile application is configured to verify a transmission from the venue apparatus in a registry when the mobile communication device is within three feet of the venue apparatus.

11 Claims, 7 Drawing Sheets

SYSTEM AND METHOD FOR COMMUNICATING BETWEEN A MOBILE COMMUNICATION DEVICE AND A GAMING DEVICE

CROSS REFERENCES TO RELATED APPLICATIONS

The present application is a continuation application of U.S. patent application Ser. No. 14/726,507, filed on May 30, 2015, which is a continuation application of U.S. patent application Ser. No. 14/206,155, filed on Mar. 12, 2014, now U.S. Pat. No. 9,058,620, issued on Jun. 16, 2015, which claims priority to U.S. Provisional Patent Application No. 61/931,639 filed on Jan. 26, 2014, all of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to wireless communications. More specifically, the present invention relates to a method and system for communicating between a mobile communication device and a venue device.

Description of the Related Art

Venues want to easily connect to their customers in a manner that is both acceptable to the customer and likely to result in a benefit to the venue.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

BLUETOOTH LOW ENERGY (aka "BLE" or "BLUETOOTH LE") is a communication format from the Bluetooth Special Interest Group which uses the 2.4 gigaHertz band of BLUETOOTH technology but with a simpler modulation system that supports data pockets ranging from 8 to 27 octets, which are transferred at 1 Mbps.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

DHCP (Dynamic Host Configuration Protocol) is a standard network protocol defined by RFC 1541 that allows a server to dynamically distribute IP addressing and configuration information, such as the subnet mask and the default gateway, to clients upon client requests.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a pre-determined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

The prior art has failed to disclose a system that allows a venue to easily connect to their customers in a manner that is both acceptable to the customer and likely to result in a benefit to the venue. The venue must identify how to universally connect with customers since the connection mechanism must be able to reach customers of different geographic regions, cultures, economics, ethnicities, races, religions, and the like. Further, the venue must implement a connection mechanism that is compatible with the existing infrastructure of the venue.

BRIEF SUMMARY OF THE INVENTION

The present invention provides a solution that allows a venue to easily connect to their customers in a manner that is both acceptable to the customer and likely to result in a benefit to the venue. Further, the connection mechanism provides for a universal connection that is implemented using the existing infrastructure of the venue.

One aspect of the present invention is a system for communicating between a mobile communication device and a gaming device. The system comprises a mobile communication device, a gaming device, and a wireless local area network (WLAN) for a venue. The mobile communication device comprises a resident mobile application, the mobile resident application configured to receive a communication utilizing a low energy BLUETOOTH communication format. The gaming device comprises a beacon for transmitting low energy BLUETOOTH transmissions. The mobile application is configured to verify a transmission from the gaming device in a registry when the mobile communication device is within three feet of the gaming device. The mobile application is configured to send over the WLAN an acknowledgement transmission upon instructions from an end-user of the mobile communication device. Rewards program data for the end-user is transmitted to the gaming device upon receipt of the acknowledgement transmission. The gaming device is configured to present a greeting to the end-user.

Another aspect of the present invention is a method for communicating between a mobile communication device and a gaming device. The method includes receiving a low energy BLUETOOTH transmission from a gaming device at a mobile application resident on a mobile communication device of a end-user, the end-user a member of a rewards program of venue, the transmission comprising an identification of the gaming device, wherein the transmission is received within three feet of the gaming device. The method also includes verifying the transmission from the gaming device at a registry. The method also includes transmitting an acknowledgement transmission over a WLAN of the venue upon instructions from an end-user of the mobile communication device. The method also includes connecting to the gaming device over the WLAN. The method also includes presenting a greeting to the end-user from the gaming device.

Yet another aspect of the present invention is a method for communicating between a mobile communication device and a venue apparatus. The method includes receiving a low energy BLUETOOTH transmission from a beacon of venue apparatus at a mobile application resident on a mobile communication device of a end-user, the end-user a member of a rewards program of a venue, the transmission comprising an identification of the venue apparatus, wherein the transmission is received within three feet of the venue apparatus. The method also includes verifying the transmission from the venue apparatus at a registry. The method also includes transmitting an acknowledgement transmission over a WLAN of a venue upon instructions from an end-user of the mobile communication device. The method also includes connecting to the venue apparatus over the WLAN. The method also includes presenting a greeting to the end-user from the venue apparatus.

Yet another aspect of the present invention is a system for communicating between a mobile communication device and a venue apparatus. The system comprises a mobile communication device, a venue apparatus, and a wireless local area network (WLAN) for a venue. The mobile communication device comprises a resident mobile application, the mobile resident application configured to receive a communication utilizing a low energy BLUETOOTH communication format. The venue apparatus comprises a beacon for transmitting low energy BLUETOOTH transmissions. The mobile application is configured to verify a transmission from the venue apparatus in a registry when the mobile communication device is within three feet of the venue apparatus. The mobile application is configured to send over the WLAN an acknowledgement transmission upon instructions from an end-user of the mobile communication device. Rewards program data for the end-user is transmitted to the venue apparatus upon receipt of the acknowledgement transmission. The venue apparatus is configured to present a greeting to the end-user.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
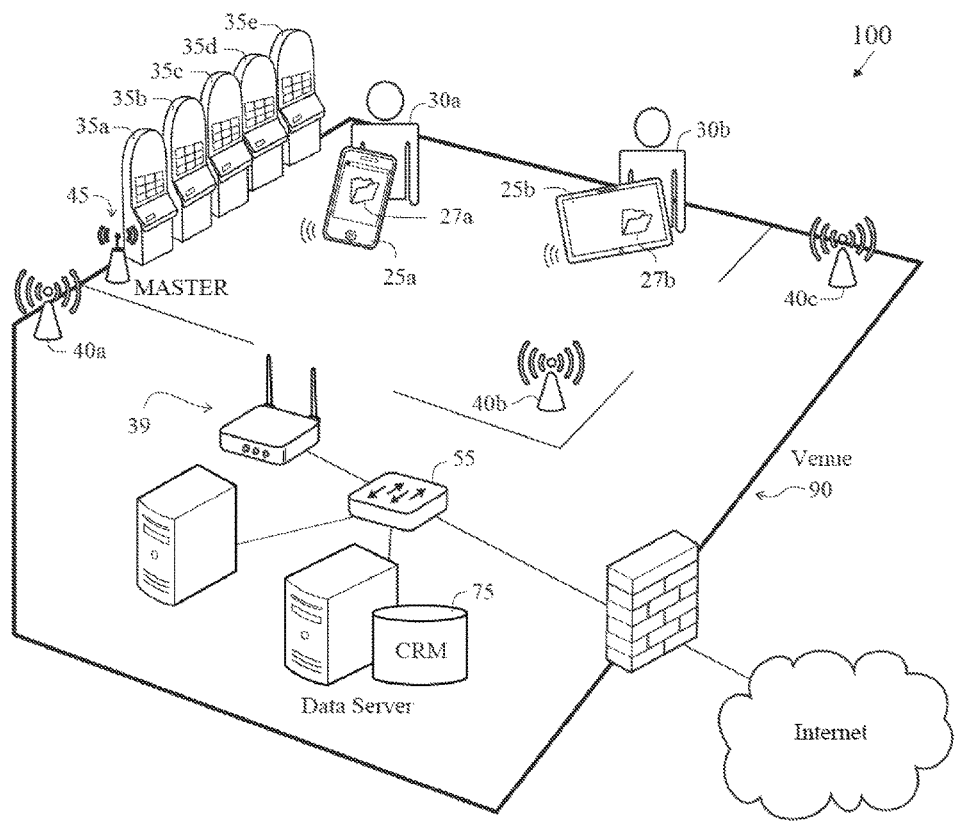
FIG. 1 is an illustration of a venue in which there is communications between mobile communication devices and venue devices.

As shown in FIG. 1, a system for communicating between a mobile communication device and a venue apparatus is generally designated 100. The system 100 preferably comprises mobile communication device 25, venue apparatuses 35a-35e, and a wireless local area network (WLAN) 39 comprising wireless access points 40a-40c and a router 55 for a venue 90. Each mobile communication device 25a-25b comprises a resident mobile application 27a-27b. The resident mobile application 27 is configured to receive a communication utilizing a low energy BLUETOOTH communication format. The venue apparatus 35 comprises a beacon 45 for transmitting low energy BLUETOOTH transmissions. The mobile application 27 is configured to verify a transmission from the beacon 45 of the venue apparatus 35 in a registry when the mobile communication device 25 is within a predetermined distance of the venue apparatus 35. The mobile application 27 is configured to send over the WLAN 39 an acknowledgement transmission upon instructions from an end-user 30 of the mobile communication device 25. Rewards program data for the end-user 30 is transmitted to the venue apparatus 35 upon receipt of the acknowledgement transmission. The venue apparatus 35 is configured to present a personal greeting to the end-user 30.

The venue is preferably any type of organization that desires to reward customers, engage customers, conduct a mobile marketing campaign or similar mobile marketing program to customers. The venue is preferably a casino, resort or leisure facility. Alternatively, the venue is preferably one of an airport, a hospital, a convention center, a university, a school, an amusement park, or a municipality. However those skilled in the pertinent art will recognize that the venue may be another area, building or the like without departing from the scope and spirit of the present invention. Those skilled in the pertinent art will recognize other types of enterprises that can use the present invention.

The venue apparatus 35 is preferably a kiosk for checking-in to a hotel room for the venue, a kiosk for dispensing a ticket for an entertainment event for the venue, or one of a slot machine, a poker machine, and a blackjack machine.

The venue apparatus 35 is preferably configured to retrieve player profile information for the end-user 30 over the venue WLAN 39 from an account for the end-user 30 at a venue server and CRM database 75.

The CRM database 75 preferably contains multiple files of members of the rewards program. Each file preferably contains data on a member, and the data is information provided by the member, information collected at the venue and information collected from third party sources. Information for the end-user (e.g., patron of the rewards program of the venue) preferably includes a preferred language, gender, residence, citizenship, net worth, food and drink preferences, gambling habits, value to the venue, email address, mobile device identifier, and name (if not any anonymous rewards program). The value to the venue includes the spending habits of the end-user, entertainment habits, stays at the venue, duration of stays, losses or wins if the venue is a casino, associates, and like information. The CRM database 75 is preferably located on site at the venue. Alternatively, the CRM database 75 is located off-site at a site owned by the venue or maintained by a third party.

Figure 2:
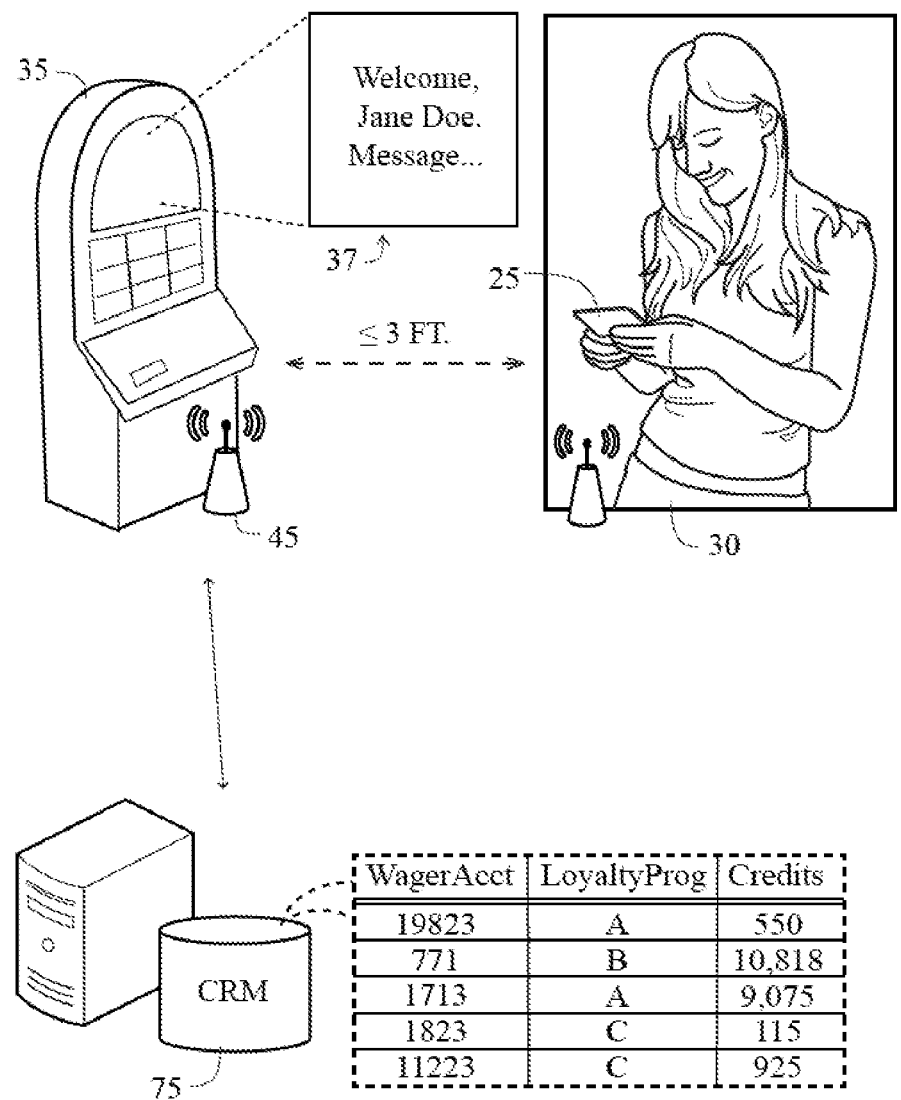
FIG. 2 is an illustration of a patron using a mobile communication device to communicate with a gaming device of a venue.

The greeting from the venue apparatus 35 is preferably an audio greeting, a tactile or a visual greeting 37, as shown in FIG. 2.

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., GALAXY S® smartphones from Samsung Electronics Co., Ltd, and many more. Examples of tablet computing devices include the IPAD® tablet from Apple Inc., and the GALAXY TAB® tablet from Samsung Electronics Co., Ltd.

Figure 3:
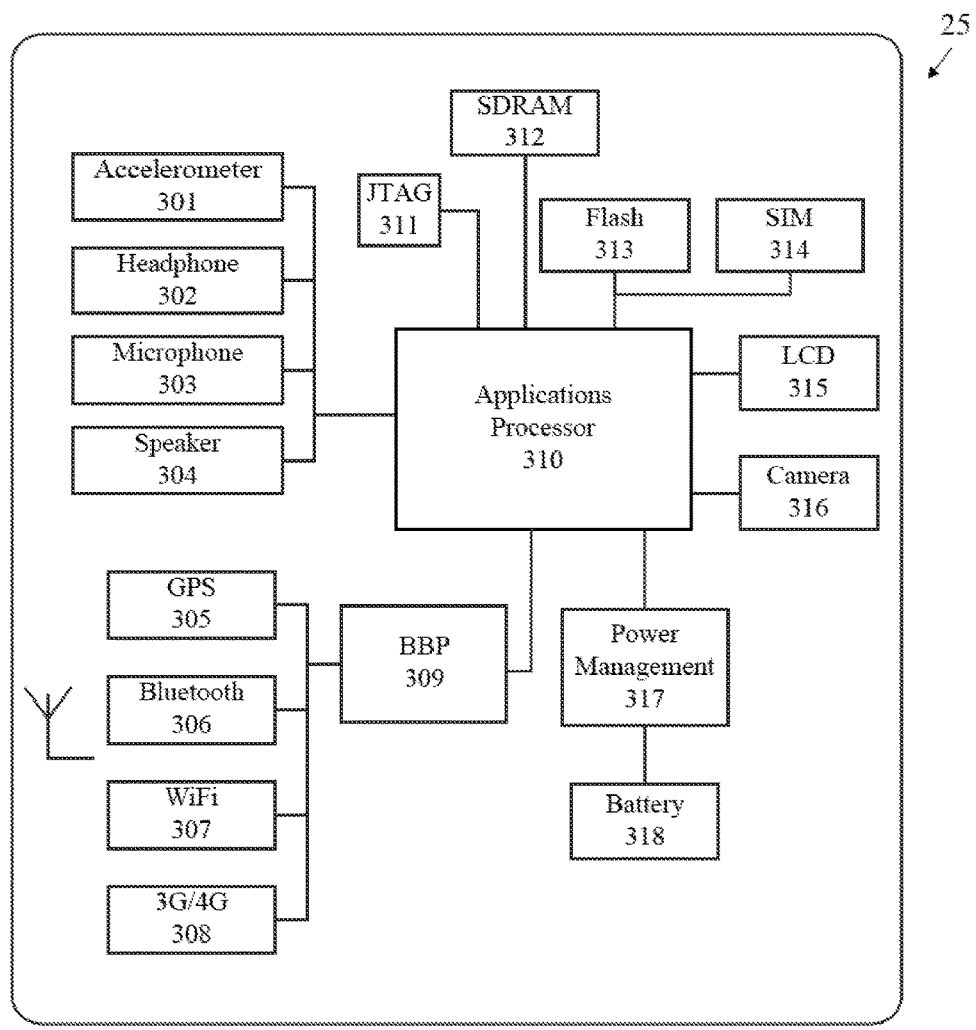
FIG. 3 is a block diagram of components of a mobile communication device.

As shown in FIG. 3, a typical mobile communication device 25 includes an accelerometer 301, a headphone jack 302, a microphone jack 303, a speaker 304, a GPS chipset 305, a Bluetooth component 306, a Wi-Fi component 307, a 3G/4G component 308, a Baseband Processor (for radio control) 309, an applications processor 310, a JTAG (debugger) 311, a SDRAM memory 312, a Flash memory 313, SIM card 314, LCD display 315, a camera 316, a power management circuit 317 and a battery or power source 318.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Components of a venue server 75 of the system 100 include the following. The data server includes a CPU component, a graphics component, PCI/PCI Express, RAM memory, non-removable storage, removable storage, Network Interface, including one or more connections to a fixed network, and a SQL database. Included in the memory, is the operating system, the SQL server, and computer programs. The venue server 75 also includes at least one computer program configured to receive data uploads and store the data uploads in the SQL database. The SQL server comprises of other components of SQL server that can be installed separately from the SQL database engine.

BLUETOOTH™ technology operates in the unlicensed 2.4 GHz band of the radio-frequency spectrum, and in a preferred embodiment each beacon 45 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment each beacon 45 is capable of receiving and transmitting signals using one or more of the LTE frequency bands. WiFi preferably operates using 802.11a, 802.11b, 802.11g, 802.11n communication formats as set forth by the IEEE.

Figure 4:
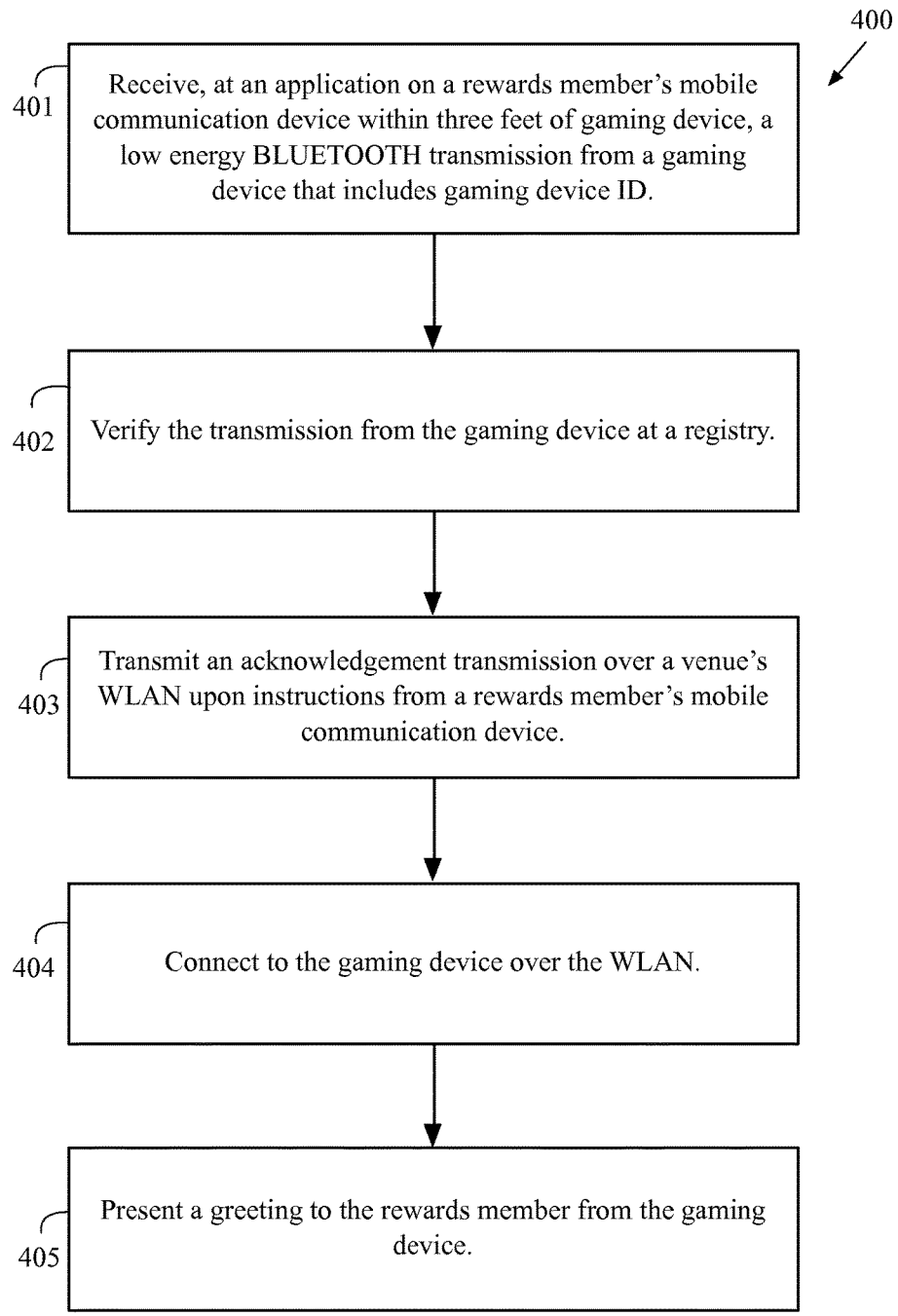
FIG. 4 is a flow chart of a method for communicating between a mobile communication device and a venue device.

A flow chart for a method 400 for communicating between a mobile communication device and a gaming device is shown in FIG. 4. At block 401, a mobile communication device receives a low energy BLUETOOTH transmission from a gaming device at a mobile application resident on the mobile communication device of an end-user. The end-user is a member of a rewards program of venue. The transmission comprises an identification of the gaming device. The transmission is received by the mobile communication device when it is within a predetermined distance of the gaming device. At block 402, the mobile communication device verifies the transmission from the gaming device at a registry. The registry is preferably stored on a database for the venue and accessed over a network. Alternatively, the registry is stored on a resident mobile application on the mobile communication device. At block 403, the resident mobile application transmits an acknowledgement transmission over a WLAN of the venue upon instructions from an end-user of the mobile communication device. At block 404, the mobile communication device connects to the gaming device over the WLAN of the venue. At block 405, the gaming device presents a greeting to the end-user. The greeting from the gaming device is preferably an audio greeting, a tactile or a visual greeting.

Figure 5:
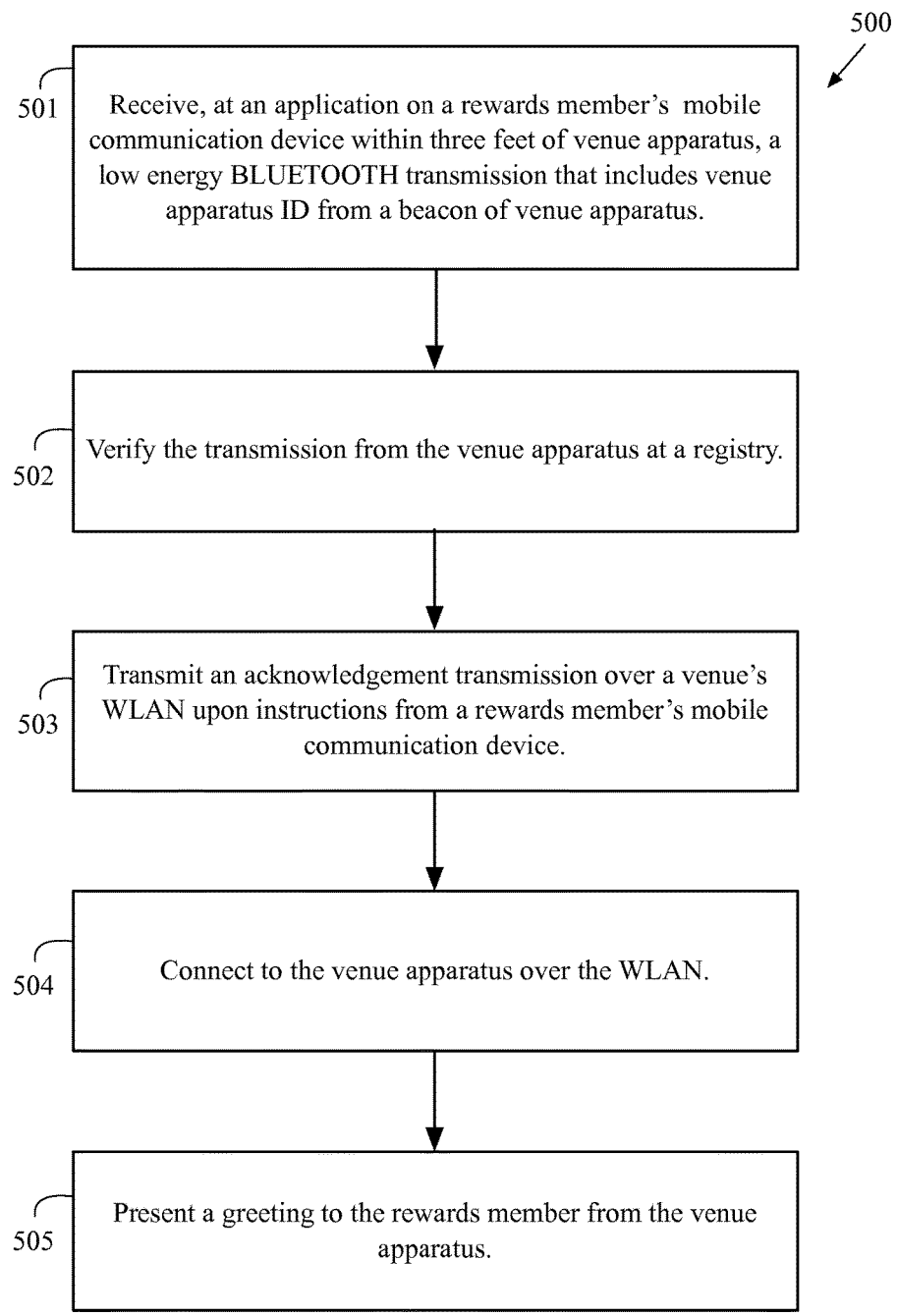
FIG. 5 is a flow chart of a method for communicating between a mobile communication device and a venue device.

A flow chart for a method 500 for communicating between a mobile communication device and a venue apparatus is shown in FIG. 5. At block 501 a mobile communication device receives a low energy BLUETOOTH transmission from a beacon of venue apparatus at a mobile application resident on the mobile communication device of an end-user. The end-user is a member of a rewards program of venue. The transmission comprises an identification of the gaming device. The transmission is received by the mobile communication device when it is within a predetermined distance of the venue apparatus. At block 502, the mobile communication device verifies the transmission from the venue apparatus at a registry. The registry is preferably stored on a database for the venue and accessed over a network. Alternatively, the registry is stored on a resident mobile application on the mobile communication device. At block 503, the resident mobile application transmits an acknowledgement transmission over a WLAN of a venue upon instructions from an end-user of the mobile communication device. At block 504, the mobile communication device connects to the venue apparatus over the WLAN. At block 505, the venue apparatus presents a greeting to the end-user. The greeting from the venue apparatus 35 is preferably an audio greeting, a tactile or a visual greeting.

Figure 6:
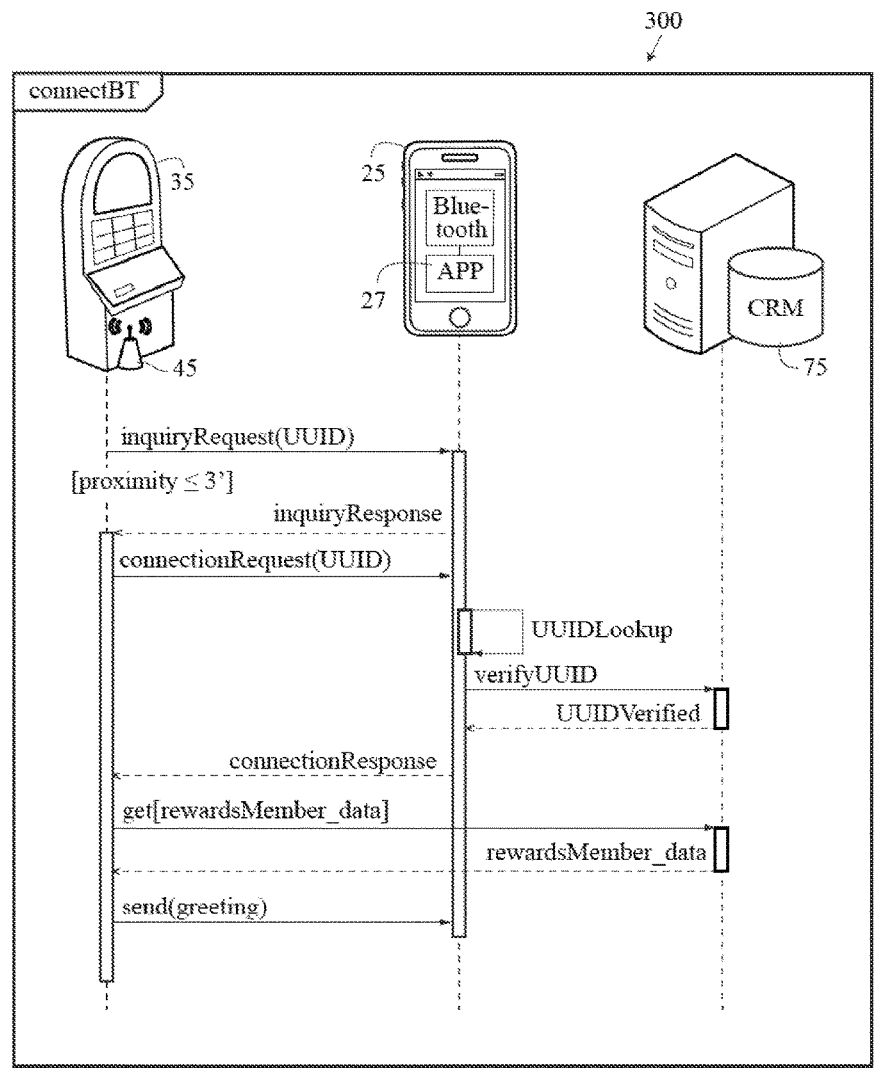
FIG. 6 is a communications sequence diagram for communications between a mobile communication device and a venue device.

A communications sequence diagram 300 for communications between a mobile communication device 25, a gaming device 35 and a venue server and CRM database 75 is shown in FIG. 6. The gaming device 35 transmits a beacon signal to discover other devices to connect to. The beacon signal preferably includes a unique identifier. Alternatively, the beacon signal comprises the gaming device name, the device class, a list of services, and a unique identifier. When a mobile device 25, which is already enabled to be discoverable, is in proximity of a predetermined distance (preferably within three feet of the gaming device 35), the beacon signal from the gaming device 35 is received by the mobile device. The predetermined distance for the beacon signal acts as a mechanism to ensure that the end-user is interested in an interaction with the gaming device 35. A preferred distance is within three feet of the gaming device 35 since if the beacon signal from the gaming device 35 is greater than three feet the end-user may be passing by and not interested in an interaction. Further, if the beacon signal from the gaming device 35 is greater than three feet there may be overlapping beacon signals received at the mobile device creating a situation where two gaming devices 35 are greeting the end-user.

The beacon signal from the gaming device 35 is received at the low energy BLUETOOTH transceiver of the mobile device 25 and sent to the resident mobile application 27. The resident mobile application 27 is for the venue rewards program and has previously been downloaded by the end-user into the memory of the mobile device 25.

The beacon signal from the gaming device 35 includes a unique identifier. The resident mobile application 27 verifies the identifier in a registry to determine if the gaming device is approved for interaction with the resident mobile application 27. The registry is preferably on the resident mobile application 27, and the verification occurs on the mobile device 25. Alternatively, the registry in at a registry database of the venue, and the resident mobile application 27 sends a request over a network to the venue server 75 to verify the identifier in the registry of a registry database of the venue. The network is preferably the WLAN of the venue, and the verification request from the resident mobile application is sent over the WLAN, and the Internet if necessary, to the venue server. Alternatively, the network is a communications network of a wireless telecommunications carrier and the verification requests is sent over the communications network, over the Internet, and to the venue server 75 for verification in the registry database.

A verification message is sent from the venue server 75 to the mobile device 25, either over the WLAN or over the communications network.

Additionally, verification prevents unauthorized interactions with the resident mobile application 27. Further, the registry may have multiple levels of authorization wherein the end-user has opted-in to interact with gaming devices (venue apparatuses) 35 at a certain level. For example, the end-user may only wish to interact with slot machines with a certain pay-out percentage, or video poker machines with a high minimum bet. Or the end user may opt to interact with only reservation kiosks. Thus, the end user has further control over the interaction providing the end-user with an added incentive to agree to such an interaction.

Once the verification process has been completed, the "connection" between the gaming device 35 and the mobile device 25 may proceed. At this point in time, the gaming device 35 prepares to present a greeting to the end-user based on profile information for the end-user in the CRM database 75 of the venue.

More preferably, the greeting is based on the accessible profile information for the end-user in the CRM database 75 of the venue, and the capabilities of the gaming device 35. Further, the interaction of the gaming device 35 with the mobile device 25 subsequent to the greeting is also preferably based on the accessible profile information for the end-user in the CRM database 75 of the venue, and the capabilities of the gaming device 35. The gaming device 35 preferably presents a visual greeting to the end-user. Alternatively, the gaming device 35 presents an audio greeting to the end-user. Alternatively, the gaming device 35 presents a tactile greeting to the end-user. Alternatively, the gaming device 35 presents an aromatic greeting to the end-user. Alternatively, the gaming device 35 presents a combination of two or more of an audio greeting, a visual greeting, a tactile greeting and aromatic greeting to the end-user.

For example, the visual greeting is a recognition of the end-user in a favorite color or pattern of the end-user on a display screen of the gaming device 35. If the end-user is an anonymous patron, the recognition may refer to a nickname associated with the end-user.

If for example the greeting is an aromatic greeting, a preferred scent of the end-user, such as pine, oranges or the ocean, is emitted from the gaming device 35.

If for example the greeting is tactile, the presentation may be a puff of hot air or cold air, a vibration of the gaming device 35, or a hot or cold handle of the gaming device 35.

If for example the greeting is audio, the greeting is in a preferred language (e.g., Mandarin) of the end-user, with a female or male voice, in a preferred tone as desired or pleasing to the end-user.

The profile data for the end-user preferably assesses the value the end-user is to the venue. A valuable end-user, financially or otherwise, receives better treatment than an end-user of lesser or unknown value to the venue. For example, the CRM database 75 may know that the end-user has lost at a particular type of gaming device 35, and the valuable end-user may be reminded by the gaming device of previous losses to maintain a good relation with the valuable end-user.

Information is received at the gaming device 35 from the venue server 75 over the venue WLAN. Preferably, the greeting is determined at the venue server 75 and transmitted to the gaming device 35 to present to the end-user. Alternatively, the data for the end-user is sent to the gaming device, and a software program is run at a processor of the gaming device 35 to determine which greeting to present to the end-user.

Thus, the resident mobile application 27 may only communicate with the venue server 75 over the WLAN, or a communication network, while the gaming device 35 acts as a "greeter" on behalf of the venue server 75.

An important object of the invention is to make the end-user feel comfortable interacting with the gaming device 35.

Further, the interaction continues subsequent to the greeting, with subsequent interactions based on the profile data for the end-user and the content of the real-time interaction.

Figure 7:
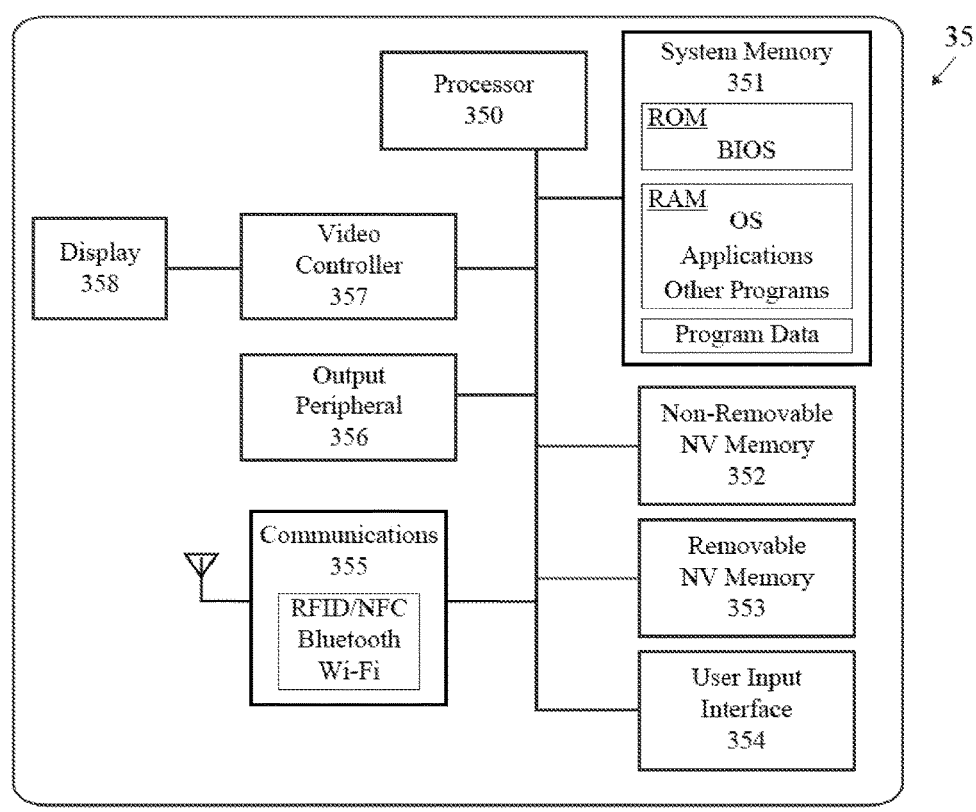
FIG. 7 is a block diagram of components of a gaming device.

As shown in FIG. 7, a typical gaming device 35 includes a processor 350, system memory 351, which includes RAM with the operating system, applications and other programs, ROM with the BIOS, and program data, non-removable non-volatile memory 352, such as a hard drive or ROM, removable non-volatile memory 353, such as flash memory or SD/MMC, a user input interface 354, communications controller 355, for WI-FI, BLUETOOTH, or RFID/NFC communications, peripheral controller 356, video controller 357, and a display 358.

The present invention may be utilized with a marketing system such as disclosed in Boyle et al., U.S. patent application Ser. No. 13/671,538, filed on Nov. 7, 2012, for a Method And System For Personalized Venue Marketing, which is hereby incorporated by reference its entirety. The present invention may be utilized with a gaming system such as disclosed in Boyle, U.S. patent application Ser. No. 13/769,376, filed on Feb. 13, 2013, for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. patent application Ser. No. 13/789,686, filed on Mar. 8, 2013, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645, for an Anonymous Rewards Club Program, which is hereby incorporated by reference in its entirety. The method and system of the present invention may be utilized with the system described in Boyle et al., U.S. patent application Ser. No. 13/783,346, filed on Mar. 3, 2013, for a Method And System For Detection And Correction of Wi-Fi Login Failure, which is hereby incorporated by reference in its entirety. The method and system of the present invention may be utilized with the system described in Greer et al., U.S. patent application Ser. No. 13/775,226, filed on Feb. 24, 2013, for a Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. patent application Ser. No. 13/974,040 filed on Aug. 22, 2013, for a Method And System For Including Content In A WiFi Stream, which is hereby incorporated by reference in its entirety. The method and system of the present invention may be utilized with the system described in Boyle, U.S. Pat. No. 8,583,777, for a Method And System For Providing Real-Time End-User WiFi Quality Data, which is hereby incorporated by reference in its entirety. The method and system of the present invention may be utilized with the system described in Boyle, U.S. patent application Ser. No. 14/145,740, filed Dec. 31, 2013, for a Method And System For Measuring The Quantity, Type And Transmission Quality Mobile Communication Devices Within A Defined Geographical Area, which is hereby incorporated by reference in its entirety. The method and system of the present invention may be utilized with the system described in Boyle, U.S. patent application Ser. No. 14/016,185, filed Sep. 2, 2013, for a Method And System For Wayfinding, which is hereby incorporated by reference in its entirety. The method and system of the present invention may be utilized with the system described in Boyle, U.S. Pat. No. 8,573,499, for a Quick Response Code Business Card, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for communicating between a mobile communication device and a gaming device, the method comprising:

receiving a low energy BLUETOOTH transmission at a gaming device from a mobile application resident on a mobile communication device of a member of rewards programs, the transmission comprising identification of the member, wherein the transmission is transmitted within three feet of the gaming device;

presenting a greeting to the member from the gaming device, the greeting based on data for the member;

wherein the resident mobile application is configured to verify a transmission from the gaming device in a registry when the mobile communication device is within three feet of the gaming device, wherein the registry has multiple levels of authorization;

wherein the resident mobile application is configured to send over a WLAN an acknowledgement transmission upon instructions from an end-user of the mobile communication device;

wherein rewards program data for the end-user is transmitted to the gaming device upon receipt of the acknowledgement transmission; and wherein the gaming device is configured to present a greeting to the end-user, and the greeting is based on profile information for the end-user in a customer relationship management database.

2. The method according to claim 1 wherein the greeting is an audio greeting.

3. The method according to claim 1 wherein the greeting is a visual greeting.

4. The method according to claim 1 wherein the greeting is a tactile greeting.

5. The method according to claim 1 wherein the gaming device is one of a slot machine, a poker machine, and a blackjack machine.

6. The method according to claim 1 wherein the gaming device is configured to retrieve player profile information for the member from an account for the player at a CRM database.

7. The method according to claim 1 wherein the mobile communication device is one of a tablet computer and a mobile phone.

8. The method according to claim 1 wherein the gaming device is configured to retrieve gaming funds for the member.

9. The method according to claim 1 further comprising configuring the gaming device to the member based on the member's profile including at least one of the amount of the bet, the pace of the game, the volume of the sound, and the graphics of the game.

10. The method according to claim 1 further comprising deactivating a gaming session for the member when the mobile communication device is more than three feet away from the gaming device.

11. The method according to claim 1 wherein the gaming device is configured to pay winnings directly to an account in a CRM database for the member.

* * * * *